| United States Patent [19] | [11] Patent Number: 4,826,939 |
|---|---|
| Stuart, Jr. | [45] Date of Patent: May 2, 1989 |

[54] HIGHLY AMORPHOUS OLEFIN TERPOLYMER

[75] Inventor: Richard K. Stuart, Jr., Longview, Tex.

[73] Assignee: Eastman Kodak Company, Rochester, N.Y.

[21] Appl. No.: 91,228

[22] Filed: Aug. 31, 1987

[51] Int. Cl.$^4$ .................. C08F 210/14; C08F 2/06
[52] U.S. Cl. .................. 526/348.5; 526/348; 526/916; 526/125; 156/334
[58] Field of Search ............ 526/348.5, 348, 125; 156/334

[56] References Cited

U.S. PATENT DOCUMENTS

| 3,645,992 | 2/1972 | Elston | 526/348.2 X |
|---|---|---|---|
| 3,923,758 | 12/1975 | Carter et al. | 260/88.2 |
| 3,954,697 | 5/1976 | McConnell et al. | 526/350 |
| 4,072,813 | 2/1978 | McConnell et al. | 526/348.2 |
| 4,168,361 | 9/1979 | Oda et al. | 526/348.6 |
| 4,259,470 | 3/1981 | Trotter et al. | 526/348.2 |
| 4,264,756 | 4/1981 | Trotter et al. | 526/348.5 X |
| 4,309,522 | 1/1982 | Dietrich et al. | 526/158 |
| 4,322,514 | 3/1982 | Miyoshi et al. | 526/125 X |
| 4,415,718 | 11/1983 | Miyoshi et al. | 526/348.6 |
| 4,736,002 | 4/1988 | Allen et al. | 526/153 X |

*Primary Examiner*—Joseph L. Schofer
*Assistant Examiner*—F. M. Teskin
*Attorney, Agent, or Firm*—Thomas R. Savitsky; William P. Heath, Jr.

[57] ABSTRACT

Disclosed are highly amorphous olefin terpolymers from propylene, 1-hexene, and ethylene in which the ethylene units are incorporated in the polymer chain in a highly random manner, and a process for producing such terpolymers.

6 Claims, No Drawings

HIGHLY AMORPHOUS OLEFIN TERPOLYMER

DESCRIPTION

Technical Field

This invention relates to highly amorphous olefin terpolymers from propylene, 1-hexene, and ethylene in which the ethylene units are incorporated in the polymer chain in a highly random manner. This invention also relates to a process for producing such terpolymers.

BACKGROUND OF THE INVENTION

U.S. Pat. No. 4,259,470 teaches a hot-melt, pressure-sensitive adhesive (HMPSA) comprising a propylene/1-butene or 1-pentene/higher alpha-olefin copolymer. The higher 1-olefin is hexene, heptane, octene, nonene, or decene and is present in the copolymers in 5 to 39 mole percent. The copolymer contains 10 to 55 mole percent propylene and 15 to 60 mole percent of either 1-butene or 1-pentene. No mention is made of ethylene in this patent.

U.S. Pat. No. 3,954,697 teaches a HMPSA comprising an amorphous propylene/higher 1-olefin copolymer containing 40 to 60 mole percent 1-olefin having a density of 0.85 to 0.86, a glass transition temperature of −30° C. to −45° C., and no measurable differential scanning calorimetry (DSC) melting point. Products from the teachings of this patent have a melt viscosity at 190° C. of 10,000 to 75,000 centipoises (cp). All the products described are copolymers. The only monomers used are propylene and hexene-1 or higher 1-olefins.

None of the above-identified patents teach terpolymers containing ethylene. Prior art references that teach terpolymers containing ethylene do not teach polymers containing hexene (e.g., U.S. Pat. No. 4,415,718). The terpolymers of the present invention are useful as single component hot-melt, pressure-sensitive adhesives useful for tapes, labels, and the assembly of disposable items such as diapers, feminine hygenic napkins, surgical gowns, and surgical drapes.

The terpolymers of the present invention have properties which are particularly advantageous in view of prior art HMPSAs. For example, the terpolymers of this invention have a lower RBSP than the copolymers of the prior art and they can be used on heat-sensitive substrates such as polyethylene films without distorting the film. Therefore a lower application temperature can be used for the terpolymers which greatly expands the areas in which they can be used.

The terpolymers of this invention are also more economically desirable than certain prior art HMPSAs in that propylene is less expensive than 1-hexene.

SUMMARY OF THE INVENTION

The present invention is directed to an amorphous terpolymer comprising repeating units from about 0.1 to about 15 percent by weight ethylene, from about 30 to about 78 percent by weight propylene, and from about 20 to about 70 percent by weight 1-hexene, the terpolymer having a ring and ball softening point of from about 75° C. to about 120° C. The terpolymers are essentially completely amorphous, and lack any crystalline character, in that they have no crystalline melting point as measured by differential scanning calorimetry (DSC).

The present invention is also directed to a process for producing an amorphous terpolymer comprising continuously polymerizing a mixture of from about 0.1 to about 10 percent by weight ethylene, from about 30 to about 78 percent by weight propylene, and from about 20 to about 70 percent by weight 1-hexene, in the presence of a catalyst comprising an anionic coordination catalyst and in a solvent medium or liquid monomer without solvent, at a temperature of from about 140° C. to about 205° C. and at a pressure of about 200 to about 3,000 pounds per square inch gauge (psig).

DETAILED DESCRIPTION OF THE INVENTION

Suitable catalysts include anionic coordination types such as commercially available aluminum-reduced titanium trichloride activated by trituration (AA—TiCl$_3$), TiCl$_4$ supported on MgCl$_2$, and TiCl$_3$ supported on MgCl$_2$. Cocatalysts employed are typical aluminum alkyls such as aluminum triethyl (AlET$_3$) and aluminum triisobutyl.

Suitable solvents for the polymerization process include aliphatic hydrocarbons such as hexane, heptane, or cyclohexane and aromatic solvents such as toluene or mixed xylenes. A particularly preferred solvent is a petroleum fraction of an aliphatic hydrocarbon mixture having a boiling point range of about 180° C. to about 220° C. commonly referred to as mineral spirits. In some instances, especially where low viscosity amorphous material is being produced, only the small amount of solvent necessary to introduce the catalyst is required. That is, the solvent is essentially unreacted monomers and molten terpolymer.

Continuous operation is a greatly preferred process, since this yields the highest degree of random incorporation of the three monomers.

Suitable polymerization temperatures are 140° C. to 250° C. with 150° C. to 180° C. being the most preferred range. The suitable pressure range is 100 to 5,000 psig. The most preferred range is 750 to 2,000 psig.

The products of the process are essentially completely amorphous. That is, they are greater than 99 percent soluble in boiling hexane and do not have a DSC melting point. Melt viscosities at 190° C. range from 100 to 100,000 cp when measured by the Thermosel method using a Brookfield Thermosel Viscometer by procedures substantially as described in American Society for Testing and Materials (ASTM) procedure D-1824–66. Ring and ball softening points (RBSP) range from about 75° C. to 120° C. RBSPs can be determined by the procedure substantially as described in ASTM method E-28.

Glass transition temperatures range from about −20° C. to about −35° C. Glass transition temperatures can be determined using a differential scanning calorimeter by procedures substantially as described in ASTM Procedure D-3418. Ethylene contents range from about 0.1 to about 10 percent as determined by material balances across the reactor. Above about 10% ethylene, some blocking may be encountered because of higher reactivity of the ethylene. Hexene contents range from about 20 percent to about 70 percent as determined by infrared spectrum data. Propylene contents range from about 30 percent to about 78 percent.

Since ethylene is many times more reactive than propylene and 1-hexene, it was completely unexpected that substantial amounts would be incorporated without ethylene blocking occurring. This is apparently one reason why compositions of this invention should be prepared by continuous polymerization techniques. As described previously, the terpolymers prepared according to this invention show no evidence of ethylene blocking even when as much as 10 weight percent ethylene is incorporated in the terpolymer.

The higher degree of random incorporation of ethylene in terpolymers of the present invention has its most dramatic effect on the RBSP. A copolymer made according to the teachings of U.S. Pat. No. 3,954,697 containing 43 mole percent 1-hexene and 57 mole percent propylene has a RBSP of 125° C. A material of similar viscosity made by the present process containing 55 mole percent propylene, 42 mole percent 1-hexene and 3 mole percent ethylene has a RBSP of 115° C. Thus the terpolymers of the present invention are more amorphous and are distinctly different from the product described in the prior art patent.

Also unexpected is the effect of increasing the ethylene content on the 1-hexene requirement to make a product having a given RBSP. 1-Hexene is the most expensive of the three monomers. Any method to reduce the 1-hexene requirement results in a lower manufacturing cost. The incorporation of ethylene into the terpolymers of this invention substantially reduces the 1-hexene requirement.

The probe tack of the terpolymers of the present invention is typically between about 400 and about 750 grams. Probe tack can be measured using a Polyken Probe Tack tester at a dwell time of 2 seconds and a carrier speed of 2 centimeters (cm)/second.

Peel strength of the terpolymers of the invention is typically at least about 1.2 pounds (lb)/inch. Peel strength can be measured according to Pressure Sensitive Tape Council (PSTC) Test-1, "Peel Adhesion for Single Coated Tape, 180° Angle."

Static shear adhesion of the terpolymers of this invention is typically between 0.6 and 25 hours. Static shear adhesion can be measured according to procedures described in PSTC Test-7 "Shear Adhesion (Holding Power)."

Quick stick of the terpolymers of the present invention is typically between about 1.0 and about 1.8 pound/inch. Quick stick can be measured according to procedures described in PSTC Test-5.

The terpolymers of this invention also typically have no zippering effect and leave no residue. Zippering (also known as "slip-stick") is often noticed when bonded substrates are separated, resulting from areas of poor adhesion alternating with areas of good adhesion.

The terpolymers of the present invention preferably contain from about 0.5 to about 10.0 percent by weight ethylene, from about 20 to about 70 percent by weight 1-hexene and from about 30 to about 70 percent by weight propylene; more preferred is from about 1 to about 4 percent by weight ethylene, from about 48 to about 62 percent by weight 1-hexene, and from about 35 to about 50 percent by weight propylene.

The process for producing the terpolymer is illustrated in the examples. Generally, the process consists of continuously charging the ethylene, propylene, and 1-hexene in ratios to result in the specified quantities into a reactor. Also, catalytic quantities of the catalysts specified above, and solvent specified above are also continuously charged into the reactor. Molten terpolymer may act as solvent to an extent. Temperature in the reactor is maintained at about 140° to about 205° C., preferably at about 150° to about 180° C., and pressure is maintained at about 200 to about 3,000 psig, preferably at about 750 to about 2,000 psig. Average residence times in the reactor is typically about 3.5 hours. Terpolymer as specified herein is continuously withdrawn from the reactor in solution. A typical process is further described in Example 2.

The following examples are submitted for a better understanding of the invention, but should not be interpreted on a limitation thereon. Unless otherwise specified, all parts, percentages ratios, etc., are by weight.

Example 1

This example describes the synthesis of propylene-hexene-1 copolymer in the continuous process.

A 6.7-gallon stirred loop reactor was fed continuously with propylene hexene-1, mineral spirits, and catalyst in mineral spirits (catalyst mixture or slurry). The copolymer, monomer, and solvent mixture containing catalyst was removed from the reactor continuously to a letdown tank. Unreacted monomers were flashed overhead. The copolymer-solvent mixture was filtered to remove solid catalyst particles, alumina bed treated, and finally stripped to remove solvent.

Reactor conditions and monomer conversions were as shown:

| | |
|---|---|
| Propylene Charge | 2.8 Lb/Hr |
| Hexene-1 Charge | 7.1 Lb/Hr |
| Mineral Spirits Charge | 2.2 Lb/Hr |
| Catalyst Charge | $5.0 \times 10^{-3}$ Lb/Hr |
| Catalyst | LYNX 900 (Catalyst Resources, Inc.) |
| Cocatalyst | $Et_3Al$ |
| Cocatalyst/Catalyst Mole Ratio | 1/1 |
| Copolymer Produced | 6.7 Lb/Hr |
| Propylene Conversion | 80.2 Percent |
| 1-Hexene Conversion | 61.9 Percent |
| Reactor Temperature | 162° C. |
| Reactor Jacket Temperature | 155° C. |
| Reactor Pressure | 1,040 psig |
| Stirrer Speed | 750 Revolutions Per Minute (RPM) |

The propylene-hexene copolymer has a viscosity at 190° C. of 17,250 cp and a RBSP of 129° C. It contained 45 mole percent (62 weight %) hexene-1 incorporated as determined by both infrared analysis and Carbon 13 nuclear magnetic resonance (NMR). The glass transition temperature was −27.9° C.

Example 2

The same reactor described in Example 1 was used to prepare this propylene, hexene-1, ethylene terpolymer. Target viscosity at 190° C. was 20,000 to 25,000 cp. Reactor conditions and monomer conversion are shown below:

| | |
|---|---|
| Propylene Charge | 2.87 Lb/Hr |
| Hexene-1 Charge | 7.09 Lb/Hr |
| Ethylene Charge | $1.48 \times 10^{-1}$ Lb/Hr |
| Mineral Spirits Charge | 2.96 Lb/Hr |
| Catalyst Charge | $3.0 \times 10^{-3}$ Lb/Hr |
| Catalyst | LYNX 900 (Catalyst Resources, Inc.) |
| Cocatalyst | $Et_3Al$ |
| Cocatalyst/Catalyst Mole Ratio | 1/1 |
| Terpolymer Produced | 6.5 Lb/Hr |
| Propylene Conversion | 89.9 Percent |
| Hexene-1 Conversion | 61.8 Percent |
| Ethylene Conversion | 96.6 Percent |
| Reactor Temperature | 161° C. |

| -continued | |
|---|---|
| Reactor Jacket Temperature | 154° C. |
| Reactor Pressure | 1,040 psig |
| Stirrer Speed | 750 RPM |

Terpolymers were obtained at production rates of 6.51 pounds per hour in yields of 1,857 pounds per pound of Lynx 900 catalyst. The viscosity was 18,500 cp at 190° C. and the RBSP was 96° C. The product contained 3 percent ethylene based on material balance. It contained 49 mole percent (66 weight %) hexene-1 by infrared spectral analysis.

Thus this example shows that incorporation of as little as 3 percent ethylene in the terpolymer lowers the RBSP from 129° C. to 96° C. By lowering the 1-hexene content, which is economically desirable, a good balance of PSA properties and physical properties can be achieved as shown in Example 3.

Example 3

Example 1 was shown to serve as a base point to show the effect of using ethylene to reduce the 1-hexene requirement. The sample reactor described in Example 1 was used to prepare this propylene, hexene-1, ethylene terpolymer. Target RBSP was 110° C. to 115° C. Target viscosity at 190° C. was 20,000 to 25,000 cp. Reactor conditions and monomer conversion were as shown:

| Propylene Charge | 3.5 Lb/Hr |
|---|---|
| Hexene-1 Charge | 5.9 Lb/Hr |
| Mineral Spirits Charge | 2.9 Lb/Hr |
| Ethylene Charge | 0.15 Lb/Hr |
| Catalyst Charge | $2.0 \times 10^{-3}$ Lb/Hr |
| Catalyst | LYNX 900 (Catalyst Resources, Inc.) |
| Cocatalyst | Et$_3$Al |
| Cocatalyst/Catalyst Mole Ratio | 1/1 |
| Terpolymer Produced | 6.2 Lb/Hr |
| Propylene Conversion | 82.3 Percent |
| Hexene-1 Conversion | 53.9 Percent |
| Ethylene Conversion | 92.5 Percent |
| Reactor Temperature | 164° C. |
| Reactor Jacket Temperature | 152° C. |
| Reactor Pressure | 1,040 psig |
| Stirrer Speed | 750 RPM |

Terpolymer was obtained at production rates of 6.23 pounds per hour in yields of 2,462 pounds per pound of Lynx 900 catalyst. The viscosity was 23,100 cp at 190° C. and the RBSP was 112° C. The product contained 2.3 percent ethylene based on material balance. It contained 40.0 mole percent (57 weight %) 1-hexene by infrared spectral analysis. The glass transition temperature was −27° C. The PSA properties are shown in Table I and are comparable to those of Example 1.

Example 4

The copolymer and terpolymer prepared in Examples 1, 2, and 3 were compared and the results are summarized in Table I.

| Propylene Charge | 3.5 Lb/Hr |
|---|---|
| Hexene-1 Charge | 5.9 Lb/Hr |
| Mineral Spirits Charge | 2.9 Lb/Hr |
| Ethylene Charge | 0.15 Lb/Hr |
| Catalyst Charge | $2.0 \times 10^{-3}$ Lb/Hr |
| Catalyst | LYNX 900 (Catalyst Resources, Inc.) |
| Cocatalyst | Et$_3$Al |
| Cocatalyst/Catalyst Mole Ratio | 1/1 |
| Terpolymer Produced | 6.2 Lb/Hr |
| Propylene Conversion | 82.3 Percent |
| Hexene-1 Conversion | 53.9 Percent |
| Ethylene Conversion | 92.5 Percent |
| Reactor Temperature | 164° C. |
| Reactor Jacket Temperature | 152° C. |
| Reactor Pressure | 1,040 psig |
| Stirrer Speed | 750 RPM |

I claim:

1. An amorphous, pressure-sensitive terpolymer comprising repeating units from about 0.1 to about 10 percent by weight ethylene, from about 30 to about 78 percent by weight propylene, and from 20 to 70 percent by weight 1-hexene, the terpolymer having a ring and ball softening point of from about 75° C. to about 120° C., a melt viscosity of from about 100 to about 100,000 cp at 190° C., no DSC melting point, and a 180° peel strength of at least about 1.2 pounds/inch.

2. The amorphous terpolymer of claim 1 having a melt viscosity of from about 1,000 to about 20,000 cp at 190° C., and a softening point of from about 80° C. to about 115° C.

3. The amorphous terpolymer of claim 1 having from about 0.5 to about 10 percent by weight ethylene, from about 30 to about 60 percent by weight 1-hexene, and from about 30 to about 65 percent by weight propylene.

4. The amorphous terpolymer of claim 1 having from about 2 to about 4 percent by weight ethylene, from about 48 to about 62 percent by weight 1-hexene, and from about 35 to about 50 percent by weight propylene.

5. A process for producing an amorphous, pressure-sensitive terpolymer having no DSC melting point comprising continuously polymerizing a mixture of from about 0.1 to about 10 percent by weight ethylene, from about 30 to about 78 percent by weight propylene, and from about 20 to about 70 percent by weight 1-hexene, in the presence of a catalyst comprising an anionic coordination catalyst and in a solvent medium, at a temperature of from about 140° C. to about 250° C. and at a pressure of about 100 to about 5,000 pounds per square inch gauge.

6. The process of claim 5 wherein said temperature is from about 150° C. to about 180° C. and the pressure is from about 750 to about 2,000 psig.

* * * * *